(12) United States Patent
Strosser et al.

(10) Patent No.: US 7,483,780 B2
(45) Date of Patent: Jan. 27, 2009

(54) APPARATUS AND METHOD TO CALIBRATE THE REEL OF AN AGRICULTURAL WINDROWER

(75) Inventors: Richard P. Strosser, Akron, PA (US); Mark K. Chow, Paoli, PA (US); Charles H. Hoffman, New Holland, PA (US)

(73) Assignee: CNH America LLC, New Holland, PA (US)

( * ) Notice: Subject to any disclaimer, the term of this patent is extended or adjusted under 35 U.S.C. 154(b) by 58 days.

(21) Appl. No.: 11/487,816

(22) Filed: Jul. 17, 2006

(65) Prior Publication Data

US 2007/0012012 A1 Jan. 18, 2007

Related U.S. Application Data

(60) Provisional application No. 60/699,610, filed on Jul. 15, 2005, provisional application No. 60/699,489, filed on Jul. 15, 2005.

(51) Int. Cl.
*G06F 7/70* (2006.01)
(52) U.S. Cl. ...................... 701/50; 56/10.2 R
(58) Field of Classification Search ............. 701/1, 701/36, 50, 70; 56/10.2 R, 10.2 A, 10.2 GF, 56/10.2 H; 180/53–53.8
See application file for complete search history.

(56) References Cited

U.S. PATENT DOCUMENTS

| | | | |
|---|---|---|---|
| 4,527,241 A | 7/1985 | Sheehan et al. | 364/424 |
| 4,967,544 A | 11/1990 | Ziegler et al. | 56/10.2 |
| 5,005,342 A | 4/1991 | Lundahl et al. | 56/10.2 |
| 5,524,424 A | 6/1996 | Halgrimson et al. | 56/10.2 |
| 6,112,139 A | 8/2000 | Schubert et al. | 701/2 |
| 6,546,705 B2 | 4/2003 | Scarlett et al. | 56/10.2 R |
| 6,591,591 B2 | 7/2003 | Coers et al. | 56/10.2 G |
| 6,865,870 B2 | 3/2005 | Heisey | 56/10.2 G |
| 6,901,729 B1 | 6/2005 | Otto et al. | 56/208 |
| 7,168,229 B1 * | 1/2007 | Hoffman et al. | 56/208 |
| 7,306,062 B2 * | 12/2007 | Dunn | 180/6.48 |

* cited by examiner

*Primary Examiner*—Richard M. Camby
(74) *Attorney, Agent, or Firm*—Patrick M. Sheldrake; John William Stader; Michael G. Harms

(57) ABSTRACT

An apparatus and method for calibrating the reel of an agricultural windrower, wherein a programmable control module in connection with a signal operated device in operative control of a variable displacement pump operable for controlling operation of the reel, is programmed as part of an automatic calibration routine for directing signals to the device having different values, for rotating the reel at two different speeds. The controller will then determine a characteristic algorithm or relationship between reel speed and signal value which will be predictive of reel speeds which will be achieved for a range of signal values.

9 Claims, 28 Drawing Sheets

```
/*
    MODULE:         Reel_Cntrl.006.c    rps2005feb160649

DESCRIPTION:    The reel speed sub-system will use a (2) point calibration. The the operator will be required
                    and select the Reel Speed Calibration. Information on the (4) line display will guide the Deal
                    ERPM to high idle, Engaging the PTO Emergency Stop. The XCM will apply 1100ma and the Reel wil
                    advise the operator to depress the Reel Speed Increment Switch and begin counting the number of
                    should be marked with a piece of duct tape or similar marking means to allow the operator to ea
                    operator will be advised via an audible alarm and display prompt to stop counting. The operato
                    the count shown on the display, using the horizontal select keys, to match the operator's count Once the operator has entered his count, he will be prompted to to depress the Reel Speed Incre
                    revolutions of the Reel a second time. The operator will be advised via an audible alarm and d
                    will then be asked to increment or decrement the count shown on the display, using the horizont
                    The count should be close to 80 for (6) cylinder models and 90 for (4) cylinder models.

The control system will now have enough information to calculate the current setpoints to produ
                    The control system will assume linear operation between these (2) points.

REVISION HISTORY:
        rps2005feb140730
        18-Jun-2002 0629        (rstross)
        jpeters2003Feb071911
        Reel_Cntrl.003.c  -  12-Apr-2004  rfackler
        Reel_Cntrl.004.c  -  11 May-2004  rfackler

*/ include "alarm.h"
include "can1_out.h"
#include "changes.h"
#include "Dsplxmit.h"
#include "fox.h"
#include "Gnd_speed.h"
#include "header.h"
#include "main.h"
#include "menu.h"
#include "neustart.h"
#include "Pto_Switch.h"
#include "Reel_Cntrl.h"
#include "Reel_Icntrl.h"
#include "Reel_Switch.h"
#include "Sys_vars.h"
#include "throttle.h"
#include "Timer.h"

/****************
    DEFINITIONS
```

Fig. 5

```
/******************/
// CONSTANT define   _v_MIN_RPM_b3                       velocity_rpm_b3_ui( 20.00 )
define   _v_MAX_RPM_b3                       velocity_rpm_b3_ui( 78.00 )

#define   _v_min_CURRENT_ma_b3_ui             current_ma_b3_ui( 800  )   //Default...Calibration will ove
#define   _v_min_CURRENT_TOL_ma_b3_ui         current_ma_b3_ui( 250  )
#define   _v_max_CURRENT_ma_b3_ui             current_ma_b3_ui( 1600 )   //Default...Calibration will ove
#define   _v_max_CURRENT_TOL_ma_b3_ui         current_ma_b3_ui( 250  )

#define   _gain_MA_PER_RPM_b3_uc              gain_b3_ui( 13.8 )

#define   _AUTO_GNDSPD_THR_LO_mph_d1          velocity_mph_d1_ui( 2.50 )   // If ground speed falls below _
define   _AUTO_GNDSPD_THR_HI_mph_d1          velocity_mph_d1_ui( 3.00 )   // If ground speed rises above _ define   _reel_dump_on                       iomap_HSDpwmout_L35_reel_dump_solenoid=1
define   _reel_dump_off                      iomap_HSDpwmout_L35_reel_dump_solenoid=0
#define   _low_side_for_PTO_power_relay_on    iomap_LSDout_K23_low_side_for_PTO_power=0
define   _hdr_emerg_stop_debounced           iomap_digin_swstate_S17_hdr_pto_emerg_stop.debounced define   _ratio_reel_rpm_to_mph_b3           gain_b3_si( 8.003 )          // Reel rpm / mph   Notes:   1m

// ENUMERATIONS

// UNITS
/*****************
   MAPPING
*****************/
// REFERENCES:

// INPUTS: DIGITAL - POSITIVE LOGIC...ON = NON-ZERO...OFF = 0.

// INPUTS: ANALOG define   _v_gnd_mph_d1                       Gnd_speed_x_ten.filtered                             //rstross2002Oct020702
define   _v_setpt_rpm_b0                     reel_switch_setpoint_status_b0_ui()                  // _state_MAN
#define   _i_setpt_ma_b3                      reel_switch_setpoint_status_b0_ui()                  // _state_ICNTRL
#define   _ratio_reel_mph_to_gnd_mph_b0       reel_switch_setpoint_status_b0_ui()                  // _state_AUTO 110% to 130
#define   _reel_speed_inc_dec_1h              ( iomap_digin_swstate_S20_reel_speed_incr.1h || iomap_digin_swsta

// OUTPUTS: DIGITAL - POSITIVE LOGIC...ON = NON-ZERO...OFF = 0.

// OUTPUTS: PWM TYPE
/*****************
```

Fig. 6

```
VARIABLES
**************/

// GLOBAL SCOPE unsigned char  reel_v_observed_rpm_b0_uc;

// MODULE SCOPE
    static unsigned int     reel_speed_auto_rpm_b3_ui;
    static unsigned int     reel_timer01;
    static signed int       prev_reel_rpm_b0_si;
    static unsigned char    interactive_cal_proceed_flag_b0_uc;
    static unsigned char    state_prev;
    static unsigned int     i_out_ma_b3;
    static signed long      integrator_b12;
    static enum reel_cal_states    reel_cal_state_b0_ui;
    static unsigned int     prev_reel_cal_state_b0_ui;
    static enum reel_cntrl_states  reel_cntrl_state_b0_ui;

static struct UFOX_FN FN1[] = {
        { _v_MIN_RPM_b3,       0, current_ma_b3_ui( 0 ) },
        { _v_MIN_RPM_b3,       1, current_ma_b3_ui( 0 ) },
        { _v_MAX_RPM_b3,          current_ma_b3_ui( 0 ) },
        {                  65535, current_ma_b3_ui( 0 ) }
    };

/****************
FUNCTION PROTOTYPING - MODULE SCOPE
****************/ static void          reel_cntrl_init( void );
    static void          reel_cntrl_main( void );
    static unsigned int  v_to_i( unsigned int );
    static void          reel_calibrate( void );

/******************************************************************/
void reel_cntrl( const unsigned int machine_mode_b0_ui )
{
    switch( machine_mode_b0_ui )
    {
        case INIT_main_STATE_MACHINE:
        case CRITICAL_EE_VARS_OUT_OF_BOUNDS:
        case WAKEUP_TEST_OUTPUTS:
        case WAKEUP_LIGHTS_ONLY:
        case NORMAL_ENGINE_OFF:
        case NORMAL_ENGINE_STARTING:
        case DIAG_N_SETUP_ENGINE_OFF:
        case POWER_DOWN:
```

Fig. 7

```
        case  XCM_SETUP:
                // do nothing
            break;

case  WAKEUP_APPLICATION_INIT:
                reel_cntrl_init();
            break;

case  NORMAL_ENGINE_RUNNING:
                reel_cntrl_main();
            break;

case  CALIBRATION_ENGINE_STARTING:
        case  CALIBRATION_ENGINE_RUNNING:
                reel_calibrate();
            break;
    }
}
/****************************************************************/
void reel_cntrl_ee_validation(void)
{
    if
    (
        ( ee_reel_pt1_current_ma_b3_ui  <  (_v_min_CURRENT_ma_b3_ui  -  _v_min_CURRENT_TOL_ma_b3_ui ) )
     || ( ee_reel_pt1_current_ma_b3_ui  >  (_v_min_CURRENT_ma_b3_ui  +  _v_min_CURRENT_TOL_ma_b3_ui ) )
    )
        ee_reel_pt1_current_ma_b3_ui = _v_min_CURRENT_ma_b3_ui;

if
    (
        ( ee_reel_pt2_current_ma_b3_ui  <  (_v_max_CURRENT_ma_b3_ui  -  _v_max_CURRENT_TOL_ma_b3_ui ) )
     || ( ee_reel_pt2_current_ma_b3_ui  >  (_v_max_CURRENT_ma_b3_ui  +  _v_max_CURRENT_TOL_ma_b3_ui ) )
    )
        ee_reel_pt2_current_ma_b3_ui = _v_max_CURRENT_ma_b3_ui;
}
/****************************************************************/
static void  reel_cntrl_init( void )
{
    _reel_timer01 = 0;

FN1[0].y  =  current_ma_b3_ui(0);
    FN1[1].y  =  current_ma_b3_ui(0);
    FN1[2].y  =  ee_reel_pt1_current_ma_b3_ui;
    FN1[3].y  =  ee_reel_pt2_current_ma_b3_ui;
    FN1[4].y  =  ee_reel_pt2_current_ma_b3_ui;
}
```

```
/*************************************************************/
static void   reel_cntrl_main( void )
{
    unsigned int  __v_setpt_auto_rpm_b3;                          // function variable _i_out_ma_b3 = current_ma_b3_si(0);                           // Output current defaulte if( Pto_control_state_b0_uc == PTO_STATE_OFF )                //Check for PTO running
        _reel_cntrl_state_b0_ui = REEL_CNTRL_STATE_OFF;

if( _reel_cntrl_state_b0_ui != _state_prev )
    {
        switch( _reel_cntrl_state_b0_ui )
        {
            case REEL_CNTRL_STATE_MAN:
            case REEL_CNTRL_STATE_AUTO:
                _integrator_bi2 = 0;
                break;
        }
    }

// State Machine
    switch( _reel_cntrl_state_b0_ui )
    {
        case REEL_CNTRL_STATE_OFF:
            _reel_speed_auto_rpm_b3_ui = 0;                       //reset reel speed to show zero
            // Inherent
            break;

case REEL_CNTRL_STATE_MAN:
            _i_out_ma_b3 = _v_to_i( __v_setpt_rpm_b0*BIN3 );
            break;

case REEL_CNTRL_STATE_AUTO:
            __v_setpt_auto_rpm_b3 = (unsigned int)(( ((unsigned long)_v_gnd_mph_d1) * _ratio_reel_rpm_to_mph_b3 * (
            if( ee_reel_manual_set_pt_b0_uc*BIN3 > velocity_rpm_b3_ui( 50.00 ) )
            {
                if( __v_setpt_auto_rpm_b3 < velocity_rpm_b3_ui( 50.00 ) )
                {
                    _i_out_ma_b3 = _v_to_i( velocity_rpm_b3_ui( 50.00 ) );       //man reel setpoint > 50 rpm...set
                    _reel_speed_auto_rpm_b3_ui = velocity_rpm_b3_ui( 50.00 );    //clamp reel speed @ 50 rpm
                }
                else
                {
                    _i_out_ma_b3 = _v_to_i( __v_setpt_auto_rpm_b3 );
                    if( __v_setpt_auto_rpm_b3 > velocity_rpm_b3_ui( 78.00 ) )
                        _reel_speed_auto_rpm_b3_ui = velocity_rpm_b3_ui( 78.00 );  //clamp reel speed @ 78 rpm
                    else
                        _reel_speed_auto_rpm_b3_ui = __v_setpt_auto_rpm_b3;        //show reel speed > 50 rpm
```

```
            }
          else
          {
            if( __v_setpt_auto_rpm_b3 < ee_reel_manual_set_pt_b0_uc*BIN3 )
            {
              _i_out_ma_b3 = _v_to_i( ee_reel_manual_set_pt_b0_uc*BIN3 );
              _reel_speed_auto_rpm_b3_ui = ee_reel_manual_set_pt_b0_uc*BIN3;      //clamp reel speed @ manual reel
            }
            else
            {
              _i_out_ma_b3 = _v_to_i( __v_setpt_auto_rpm_b3 );
              if( __v_setpt_auto_rpm_b3 > velocity_rpm_b3_ui( 78.00 ) )
                _reel_speed_auto_rpm_b3_ui = velocity_rpm_b3_ui( 78.00 );         //clamp reel speed @ 78 rpm
              else
                _reel_speed_auto_rpm_b3_ui = __v_setpt_auto_rpm_b3;               //show reel speed > manual reel
            }
          } ifdef engr_data_acq_hyd_reel_01  //rps2005feb151103
CAN_test_data2[0].word = _v_gnd_mph_d1;
CAN_test_data2[1].word = __v_setpt_auto_rpm_b3;
CAN_test_data2[2].word = _i_out_ma_b3;
CAN_test_data2[3].word = _ratio_reel_mph_to_gnd_mph_b0;
endif break;

case REEL_CNTRL_STATE_ICNTRL:
        _i_out_ma_b3 = _i_setpt_ma_b3;
      break;
    }

_state_prev = _reel_cntrl_state_b0_ui;

Reel_Icntrl_setpt(_i_out_ma_b3);                           // Output current passed to Icntrl Loop;
}

//***********************************************************************
int* reel_get_state_pi( void )
{
/*
Description:
*/
    return(&_reel_cal_state_b0_ui);
}
/***********************************************************************/
```

Fig. 10

```c
static void reel_calibrate( void )
{
    static unsigned char  _update_display_flag_b0_uc;
    static const void*    _reel_cal_msg;

#define  __reel_wait    _time_b0_ui2scans_sec_f( 1 )   //set timer to aquivalent scans
    #define  __msg_wait     _time_b0_ui2scans_sec_f( 5 )   //set timer to aquivalent scans switch( _reel_cal_state_b0_ui )
    {
    case _REEL_CAL_STATE_INIT:                  //Wait here until reel Calibration is requested
        _i_out_ma_b3=0;
        _reel_dump_off;
        return;

case _REEL_CAL_STATE_START_CALIBRATION:
        _i_out_ma_b3 = 0;
        _reel_dump_off;
        _reel_cal_msg = _cal_start_eng_menu;
        _reel_cal_state_b0_ui = _REEL_CAL_STATE_START_ENGINE;
        if( !hyd_reel_installed_b_xp || ( ee_header_type_nbl != header_type_SICKLE_xp ) )   //TBD - jpeters2004J
        {
            _reel_cal_state_b0_ui = _REEL_CAL_STATE_CHECK_CONFIG;
            _reel_timer01=0;
        }
        else
            _reel_cal_state_b0_ui = _REEL_CAL_STATE_START_ENGINE;
        break;

case _REEL_CAL_STATE_START_ENGINE:
        _reel_dump_off;
        if( NeuStart_status_bt_xp() )
        {
            menu_change_focus( _cal_start_eng_menu, _type_menu_e );
            _reel_cal_state_b0_ui = _REEL_CAL_STATE_WAIT_FOR_ENG_RUNNING;
        }
        else
        {
            menu_change_focus( get_neustart_message(), _type_menu );
        }
        break;

case _REEL_CAL_STATE_WAIT_FOR_ENG_RUNNING:
        _reel_dump_off;
        if ( !NeuStart_status_bt_xp() )
            _reel_cal_state_b0_ui = _REEL_CAL_STATE_START_ENGINE;
        if( engine_running_b_xp )
            _reel_cal_state_b0_ui = _REEL_CAL_STATE_WAIT_FOR_HI_IDLE;
        break;
```

Fig. 11

```
case _REEL_CAL_STATE_WAIT_FOR_HI_IDLE:
    _reel_dump_off;
    if( _6_cylinder_b_xp )
    {
        _reel_cal_msg = _increase_engine_speed_2150_menu;         //Set Engine Speed to 2150 rp
        throttle_set_point( 2200 );
        if( engine_oil_pressure_bt_xp && engine_v_eng_rpm_b0.filtered > 2100 )
        {
            if( ++_reel_timer01 > _time_b0_ui2scans_sec_f( 2 ) )
            {
                _reel_cal_state_b0_ui = _REEL_CAL_STATE_WAIT_FOR_REEL_INC;
            }
        }
    }
    else
    {
        _reel_cal_msg = _increase_engine_speed_2300_menu;         //Display a message to increa
        if( engine_oil_pressure_bt_xp && engine_v_eng_rpm_b0.filtered > 2250 )
            _reel_cal_state_b0_ui = _REEL_CAL_STATE_WAIT_FOR_REEL_INC;
    }
    break;

case _REEL_CAL_STATE_WAIT_FOR_REEL_INC:
    _reel_dump_off;
    _low_side_for_PTO_power_relay_on;                             //turn on LSD to look for PTO
    _reel_cal_msg = _reel_cal_wait_menu;
    if( _hdr_emerg_stop_debounced )
        _reel_cal_state_b0_ui = _REEL_CAL_STATE_SAY_WE_ARE_CALIBRATING;
    break;

case _REEL_CAL_STATE_SAY_WE_ARE_CALIBRATING:
    _reel_dump_on;
    _low_side_for_PTO_power_relay_on;                             //turn on LSD to look for PTO
    _reel_cal_msg = _reel_cal_running_menu;
    _out_ma_b3 = ee_reel_pti_current_ma_b3_ui;
    if( _interactive_cal_proceed_flag_b0_uc )                     //Qued from <ENTER> key...
    {
        _reel_timer01 = 0;
        _reel_cal_state_b0_ui = _REEL_CAL_STATE_001;
    }
    break;

case _REEL_CAL_STATE_001:
    _reel_dump_on;
    _low_side_for_PTO_power_relay_on;                             //turn on LSD to look for PTO
    _reel_cal_msg = _reel_cal_03_menu;
    _out_ma_b3 = ee_reel_pti_current_ma_b3_ui;
    if( ++_reel_timer01 > _time_b0_ui2scans_sec_f( 60 ) )
    {
```

Fig. 12

```
        Alarm_OneShot_1sec();
        reel_v_observed_rpm_b0_uc = _v_MIN_RPM_b3/BIN3;
        _reel_timer01 = 0;
        _reel_cal_state_b0_ui = _REEL_CAL_STATE_002;
    }
    break;

case _REEL_CAL_STATE_002:
    _reel_dump_off;
    _low_side_for_PTO_power_relay_on;            //turn on LSD to look for PTO
    _reel_cal_msg = _reel_cal_01_menu;

if( _interactive_cal_proceed_flag_b0_uc )    //Qued from <ENTER> key...
    {
        if( reel_v_observed_rpm_b0_uc > _v_MIN_RPM_b3/BIN3 )
            ee_reel_pt1_current_ma_b3_ui
              = (
                  ee_reel_pt1_current_ma_b3_ui
                - (
                    ( reel_v_observed_rpm_b0_uc - (_v_MIN_RPM_b3/BIN3) )
                     * _gain_MA_PER_RPM_b3_uc
                  )
                );
        else
            ee_reel_pt1_current_ma_b3_ui
              = (
                  ee_reel_pt1_current_ma_b3_ui
                + (
                    ( (_v_MIN_RPM_b3/BIN3) - reel_v_observed_rpm_b0_uc )
                     * _gain_MA_PER_RPM_b3_uc
                  )
                );

_reel_cal_state_b0_ui = _REEL_CAL_STATE_003;
    }
    break;

case _REEL_CAL_STATE_003:
    _reel_dump_on;
    _low_side_for_PTO_power_relay_on;            //turn on LSD to look for PTO switch
    _reel_cal_msg = _reel_cal_running_menu;
    _i_out_ma_b3 = ee_reel_pt2_current_ma_b3_ui;
    if( _interactive_cal_proceed_flag_b0_uc )    //Qued from <ENTER> key...
    {
        _reel_timer01 = 0;
        _reel_cal_state_b0_ui = _REEL_CAL_STATE_004;
    }
    break;

case _REEL_CAL_STATE_004:
```

Fig. 13

```
    _reel_dump_on;
    _low_side_for_PTO_power_relay_on;          //turn on LSD to look for PTO switch
    reel_cal_msg = _reel_cal_03_menu;
    i_out_ma_b3 = ee_reel_pt2_current_ma_b3_ui;
    if( ++_reel_timer01 > _time_b0_ui2scans_sec_f( 30 ) )
    {
        Alarm_OneShot_1sec();
        reel_v_observed_rpm_b0_uc = _v_MAX_RPM_b3/(BIN3*2);
        _reel_timer01 = 0;
        _reel_cal_state_b0_ui = _REEL_CAL_STATE_005;
    }
    break;

case _REEL_CAL_STATE_005:
    _reel_dump_off;
    throttle_set_point( 900 );              //Set Engine Speed to n rpm
    _reel_cal_msg = _reel_cal_02_menu;

if( _interactive_cal_proceed_flag_b0_uc )  //Qued from <ENTER> key...
    {
        if( reel_v_observed_rpm_b0_uc > _v_MAX_RPM_b3/(BIN3*2) )
            ee_reel_pt2_current_ma_b3_ui
            =
            (
                ee_reel_pt2_current_ma_b3_ui
                -
                (
                    ( reel_v_observed_rpm_b0_uc*2 - (_v_MAX_RPM_b3/BIN3) )
                    * _gain_MA_PER_RPM_b3_uc
                )
            );
        else
            ee_reel_pt2_current_ma_b3_ui
            =
            (
                ee_reel_pt2_current_ma_b3_ui
                +
                (
                    ( (_v_MAX_RPM_b3/BIN3) - reel_v_observed_rpm_b0_uc*2 )
                    * _gain_MA_PER_RPM_b3_uc
                )
            );

_reel_cal_state_b0_ui = _REEL_CAL_STATE_PASSED;
    }
    break;

case _REEL_CAL_STATE_PASSED:
    i_out_ma_b3 = 0;
    _reel_dump_off;
    _reel_cal_msg = _cal_success_menu;
    if( ++_reel_timer01 > __msg_wait )
    {
        _reel_timer01 = 0;
        _reel_cal_state_b0_ui = _REEL_CAL_STATE_EXIT;
```

*Fig. 14*

```c
        }
        break;

case _REEL_CAL_STATE_FAILED:
        _i_out_ma_b3 = 0;
        _reel_dump_off;
        _reel_cal_msg = _cal_failed_menu;
        Alarm_OneShot_1sec();
        if( ++_reel_timer01 > __msg_wait )
        {
            _reel_timer01 = 0;
            _reel_cal_state_b0_ui = _REEL_CAL_STATE_EXIT;
        }
        break;

case _REEL_CAL_STATE_CHECK_CONFIG:
        _i_out_ma_b3 = 0;
        _reel_dump_off;
        _reel_cal_msg = _cal_check_config_menu;
        if( ++_reel_timer01 > __msg_wait )
        {
            _reel_timer01 = 0;
            _reel_cal_state_b0_ui = _REEL_CAL_STATE_EXIT;
        }
        break;

case _REEL_CAL_STATE_EXIT:
        _i_out_ma_b3 = 0;
        _reel_dump_off;
        _reel_cal_msg = _cal_ended_key_off;
        if( ++_reel_timer01 > __msg_wait )
            _reel_timer01 = 0;
        break;
    } if( _update_display_flag_b0_uc == 1 )
    {
        menu_change_focus( _reel_cal_msg, _type_menu_e );   //Pass message pointer to display handler only on
        _update_display_flag_b0_uc = 0;
    } if( _reel_cal_state_b0_ui != _prev_reel_cal_state_b0_ui )
        _update_display_flag_b0_uc = 1;

_prev_reel_cal_state_b0_ui = _reel_cal_state_b0_ui;
    _interactive_cal_proceed_flag_b0_uc = 0;            //jpeters2004Apr201201  Default calibration procee Reel_Icntrl_setpt(_i_out_ma_b3);                    // Output current passed to Icntrl Loop:
}
```

Fig. 15

```c
/******************************************************/
void reel_goto_calibration( void )
{
    _reel_cal_state_b0_ui = REEL_CAL_STATE_START_CALIBRATION;
    main_request_engine_running_cal();
}

/******************************************************/
void reel_calibration_exit( void )
{
    _reel_cal_state_b0_ui = REEL_CAL_STATE_FAILED;
}

/******************************************************/
void reel_calibration_proceed( void )
{
    _interactive_cal_proceed_flag_b0_uc = 1;
}

/******************************************************/
void reel_cntrl_state_modified_to( unsigned int new_state_b0_ui )
{
    _reel_cntrl_state_b0_ui = new_state_b0_ui;
}

/******************************************************/
static unsigned int _v_to_i(unsigned int X)
{
/*
    Description: Nominal v to current: Convert velocity to current
*/
    return( UFOXW(FN1, X) );   //jpeters2004Feb201214 See FN1...FNx above.  Table initialization was moved to acc
}

/******************************************************/
unsigned int reel_speed_rpm_auto_mode_b3_ui( void )
{
    return( _reel_speed_auto_rpm_b3_ui );
}
```

*Fig. 16*

```
1  /*    MODULE:        Reel_Switch.005.c

DESCRIPTION:   Reel Switch State Control.

OPEN ISSUES:

5        REVISION HISTORY:

Reel_Switch.005.c- 12-Apr-2004 rfackler
10       jpeters2004Mar241746  Added check for hydraulic reel enable from menu and user prompt to manually engage re
         jpeters2003Apr161633  Added auto increment function to scroll through reel speed faster in Manual mode
         jpeters2003Feb130820  Changed increment values for manual and automatic modes
         10-Jun-2002 (rfackler) Module created
15       */ include "CAN1_out.h"
20  #include "changes.h"
    #include "iomap_appl.h"
    #include "main.h"
    #include "Menu.h"
    #include "MFH_map.h"
25  #include "OnDemand.h"
    #include "PTO_switch.h"
    #include "reel_cntrl.h"
    #include "reel_switch.h"
    #include "seat_switch.h"
30  #include "sys_vars.h"
    #include "Timer.h"
    #include "wigtest.h"

35  /*****************
        DEFINITIONS
    *****************/
40  // CONSTANT define  MAX_REEL_AUTO_SETPOINT        130
        #define  MIN_REEL_AUTO_SETPOINT        100
45  #ifdef   FIX_REEL_SPEED_LAB_SUPPORT                                    //mkc2005feb090712
        #define  MAX_REEL_MANUAL_SETPOINT      velocity_rpm_b0_si( 100 )   // reel at 250% of ground speed    jpete
        #define  MIN_REEL_MANUAL_SETPOINT      velocity_rpm_b0_si(  40 )   // reel at 100% of ground speed
    #else  //FIX_REEL_SPEED_LAB_SUPPORT
        #define  MAX_REEL_MANUAL_SETPOINT      velocity_rpm_b0_si(  78 )
50      #define  MIN_REEL_MANUAL_SETPOINT      velocity_rpm_b0_si(  20 )
```

Fig. 17

```
endif    //FIX_REEL_SPEED_LAB_SUPPORT define   _AUTO_WAIT_INIT               _time_b0_ui2scans_sec_f( 1.0 )
define   _DOUBLE_HIT_WAIT              _time_b0_ui2scans_sec_f( 0.3 )

// ENUMERATIONS enum _reel_switch_states( _STARTUP_DELAY,        //state 0
                          _INIT,                 //state 1
                          _REEL_START,           //state 2
                          _TEST_REEL_MODE,       //state 3
                          _AUTOMATIC,            //state 4
                          _AUTOMATIC_INCR_01,    //state 5
                          _AUTOMATIC_INCR_02,    //state 6
                          _AUTOMATIC_DECR_01,    //state 7
                          _AUTOMATIC_DECR_02,    //state 8
                          _MANUAL,               //state 9
                          _MANUAL_INCR_01,       //state 10
                          _MANUAL_INCR_02,       //state 11
                          _MANUAL_DECR_01,       //state 12
                          _MANUAL_DECR_02,       //state 13
                        );

// UNITS

/****************
    MAPPING
****************/
// REFERENCES:

// INPUTS: DIGITAL - POSITIVE LOGIC...ON = NON-ZERO...OFF = 0.

#define  _reel_speed_auto_debounced      iomap_digin_swstate_S27_reel_spd_mode_auto.debounced
    #define  _reel_speed_man_debounced       iomap_digin_swstate_S27_reel_spd_mode_man.debounced
    #define  _reel_speed_incr_debounced      iomap_digin_swstate_S20_reel_speed_incr.debounced
    #define  _reel_speed_decr_debounced      iomap_digin_swstate_S20_reel_speed_decr.debounced
    #define  _reel_speed_incr_lh             iomap_digin_swstate_S20_reel_speed_incr.lh
    #define  _reel_speed_decr_lh             iomap_digin_swstate_S20_reel_speed_decr.lh
    #define  _hdr_emerg_stop_debounced       iomap_digin_swstate_S17_hdr_pto_emerg_stop.debounced

// INPUTS: ANALOG

// OUTPUTS: DIGITAL - POSITIVE LOGIC...ON = NON-ZERO...OFF = 0.

#define  _reel_dump_on                   iomap_HSDpwmout_L35_reel_dump_solenoid=1

// OUTPUTS: PWM TYPE
```

Fig. 18

```
/**************
  VARIABLES
**************/

// GLOBAL SCOPE

// MODULE SCOPE static  enum_reel_switch_states    _reel_switch_state_b0_ui;
    static  unsigned char              _reel_user_start_enable;
    static  unsigned int               _reel_engage_timer;
    static  unsigned int               _reel_switch_setpoint_b0_ui;

/**************
  FUNCTION PROTOTYPING - MODULE SCOPE
**************/ static  void  reel_switch_state_main( void );
    static  void  reel_switch_state_machine_init( void );

/********************************************************************/
void reel_switch_ee_validation( void )
{
    // EE testing and validation tests the setpoints if( ee_reel_mode_nbl >= _REEL_MODE_END_OF_LIST )
        ee_reel_mode_nbl = _REEL_MODE_MANUAL & 0x0f;

if(   ( ee_reel_automatic_set_pt_b0_uc % 2 )         // if not a multiple of 2 or out of ra
       || ( ee_reel_automatic_set_pt_b0_uc > MAX_REEL_AUTO_SETPOINT )
       || ( ee_reel_automatic_set_pt_b0_uc < MIN_REEL_AUTO_SETPOINT )
      ) ee_reel_automatic_set_pt_b0_uc = MIN_REEL_AUTO_SETPOINT;         // want a multiple of 2 if(   ( ee_reel_manual_set_pt_b0_uc % 1 )            // if not a multiple of 1 or out of ra
       || ( ee_reel_manual_set_pt_b0_uc > MAX_REEL_MANUAL_SETPOINT )
       || ( ee_reel_manual_set_pt_b0_uc < MIN_REEL_MANUAL_SETPOINT )
      ) ee_reel_manual_set_pt_b0_uc = MIN_REEL_MANUAL_SETPOINT;          // want a multiple of 1
}

/********************************************************************/
void reel_switch( const unsigned int machine_mode_b0_ui )
{
    switch( machine_mode_b0_ui )
    {
        case INIT_main_STATE_MACHINE:
        case CRITICAL_EE_VARS_OUT_OF_BOUNDS:
```

Fig. 19

```
            case WAKEUP_TEST_OUTPUTS:
            case WAKEUP_LIGHTS_ONLY:
            case NORMAL_ENGINE_OFF:
            case NORMAL_ENGINE_STARTING:
            case DIAG_N_SETUP_ENGINE_OFF:
            case CALIBRATION_ENGINE_STARTING:
            case CALIBRATION_ENGINE_RUNNING:
            case POWER_DOWN:
            case XCM_SETUP:
                    // do nothing
                    break;

case WAKEUP_APPLICATION_INIT:

reel_switch_state_machine_init();

break;

case NORMAL_ENGINE_RUNNING:

reel_switch_state_main();

break;
            }
    }

/******************************************************************/
    static void reel_switch_state_machine_init( void )
    {
            _reel_user_start_enable = _reel_engage_timer = 0;
            _reel_switch_state_b0_ui = _STARTUP_DELAY;
    }

/******************************************************************/
    static void reel_switch_state_main( void )
    {
            static   unsigned int    __timer01, __timer02;

#ifdef engr_data_acq_prop_reel_fault

//CAN_test_data2[1].byte.lo ... reel speed incr/decr switch

CAN_test_data2[1].byte.lo = 0x7f;

if(_reel_speed_incr_debounced)
                    CAN_test_data2[1].byte.lo = 0xff;

//  if(_reel_speed_decr_debounced)
```

Fig. 20

```c
//      CAN_test_data2[1].byte.lo = 0x00;

//CAN_test_data2[1].byte.hi ... reel speed man/auto switch
// CAN_test_data2[1].byte.hi = 0x7f;

if( _reel_speed_man_debounced )
(
//      CAN_test_data2[1].byte.hi = 0x00;
        ee_reel_mode_nbl = _REEL_MODE_MANUAL & 0x0f;
)

if( _reel_speed_auto_debounced )
(
//      CAN_test_data2[1].byte.hi = 0xff;
        ee_reel_mode_nbl = _REEL_MODE_AUTOMATIC & 0x0f;
)

else if( _reel_speed_man_debounced )
        ee_reel_mode_nbl = _REEL_MODE_MANUAL & 0x0f;

if( _reel_speed_auto_debounced )
        ee_reel_mode_nbl = _REEL_MODE_AUTOMATIC & 0x0f;

endif if( _reel_switch_state_b0_ui != _STARTUP_DELAY )
(
    if
    (
         !_hdr_emerg_stop_debounced
        _6_cyl_pto_disc_b_xp
        !_hdr_switch_rev_debounc                    // if Header PTO on
         seat_switch_inhibit_PTO_operation          // if not a sickle
         pto_switch_inhibit_reel_operation_b0_uc    // header must be in FWD
        !hyd_reel_installed_b_xp                    // set == inhibit; out of seat
                                                    // set == inhibit; not running PTO
                                                    // No hydraulic reel installed
    ) _reel_switch_state_b0_ui = _INIT;

_reel_switch_state_b0_ui = reel_switch_state_b0_ui;    //
)

//CAN_test_data[0].byte.lo = reel_switch_state_b0_ui;
//CAN_test_data[0].byte.hi = Reel_switch_CAN_msg_state;
//CAN_test_data[1].byte.lo = _reel_speed_incr_debounced;
//CAN_test_data[1].byte.hi = _reel_speed_decr_debounced;
//CAN_test_data[2].word = ee_reel_automatic_set_pt_b0_uc;
//CAN_test_data[3].word = ee_reel_manual_set_pt_b0_uc;
```

Fig. 21

```
//CAN_test_data2[0].word = _timer01;
//CAN_test_data2[1].word = _timer02;

//CAN_test_data1[1].byte.lo = ee_reel_mode_b0_uc;
//CAN_test_data1[1].byte.hi = ( ( _reel_speed_incr_debounced ) - ( _reel_speed_decr_debounced ) );
//CAN_test_data1[2].word = _reel_switch_setpoint_b0_ui;
//CAN_test_data1[3].word = Header_v_reel_rpm_b0.raw;

//CAN_test_data2[0].word = ee_reel_offset_current_ma_b3_si ;
//CAN_test_data2[1].word = ee_reel_pt2_current_ma_b3_si ;
//CAN_test_data2[2].word = ee_reel_pt3_current_ma_b3_si ;
//CAN_test_data2[3].word = ee_reel_pt4_current_ma_b3_si ;

switch( _reel_switch_state_b0_ui )
{
  case _STARTUP_DELAY:
    reel_cntrl_state_modified_to( REEL_CNTRL_STATE_OFF );
    _reel_switch_setpoint_b0_ui =0;
    if( ++_timer01 >= _time_b0_ui2scans_sec_f( 2.0 ) )
      _reel_switch_state_b0_ui = _INIT;
    break;

case _INIT:
    reel_cntrl_state_modified_to( REEL_CNTRL_STATE_OFF );
    _reel_switch_setpoint_b0_ui =0;
    _reel_engage_timer = 0;
    if ( hyd_reel_installed_b_xp )                           //Only proceed to test start if config set t
      _reel_switch_state_b0_ui = _REEL_START;
    break;

case _REEL_START:
    reel_cntrl_state_modified_to( REEL_CNTRL_STATE_OFF );
    _reel_switch_setpoint_b0_ui =0;
    if( hyd_reel_installed_b_xp )                            //If hyd reel not configured, sit and spin h
    {
      if( _reel_user_start_enable )                          //only start reel if menu config set and use
        _reel_switch_state_b0_ui = _TEST_REEL_MODE;
      else
      {
        if( ++_reel_engage_timer < _time_b0_ui2scans_sec_f( 5 ) )
        {
          if( _reel_engage_timer==1 )                        //TBD - Do this for now since you can't curr
            OnDemand_add_message( od_message_33 );           //Prompt user to hit reel speed inc/dec swit
          if ( _reel_speed_incr_lh || _reel_speed_decr_lh )
          {
            _reel_user_start_enable = 1;                     //Set this flag here, it will clear with eve
            //_reel_engage_timer = 0;                        //mchow26mar2004
            OnDemand_remove_message();
            _reel_switch_state_b0_ui = _TEST_REEL_MODE;
          }
        }
```

Fig. 22

```
        }
        else
        {
            _reel_engage_timer = _time_b0_ui2scans_sec_f( 5 );
            //If user chose not to engage reel, but config parameter is set, sit and spin here till PTO res
        }
    }
    break;

case _TEST_REEL_MODE:
        _timer01 = _timer02 = 0;
        _reel_dump_on;
        if( ee_reel_mode_nbl == _REEL_MODE_AUTOMATIC )                        //jpeters2004Mar011046  Keep dump solenoid f
            _reel_switch_state_b0_ui = _AUTOMATIC;
        else if( ee_reel_mode_nbl == _REEL_MODE_MANUAL )
            _reel_switch_state_b0_ui = _MANUAL;                               // add this for robustnes
        else
            _reel_switch_state_b0_ui = _INIT;
    break;

case _AUTOMATIC:
        reel_cntrl_state_modified_to( REEL_CNTRL_STATE_AUTO );
        reel_switch_setpoint_b0_ui = ee_reel_automatic_set_pt_b0_uc;
        _reel_dump_on;                                                        // reel dump solenoid
        if( _reel_speed_incr_lh )
        {
            if( ee_reel_automatic_set_pt_b0_uc < MAX_REEL_AUTO_SETPOINT )     // test within limits
                ee_reel_automatic_set_pt_b0_uc += 2;                          // Field shows that 6% at 5.2 mph ~1rpm chan
            _reel_switch_state_b0_ui = _AUTOMATIC_INCR_01;
        }
        else if( _reel_speed_decr_lh )
        {
            _reel_switch_state_b0_ui = _AUTOMATIC_DECR_01;
            if( ee_reel_automatic_set_pt_b0_uc > MIN_REEL_AUTO_SETPOINT )     // test within limits
                ee_reel_automatic_set_pt_b0_uc -= 2;                          // Field shows that 6% at 5.2 mph ~1rpm chan
        }
        if( ee_reel_mode_nbl == _REEL_MODE_MANUAL )
            _reel_switch_state_b0_ui = _INIT;
    break;

case _AUTOMATIC_INCR_01:
        reel_switch_setpoint_b0_ui = ee_reel_automatic_set_pt_b0_uc;          //Increment has been hit, increment one unit
        _reel_dump_on;                                                        // reel dump solenoid
        // show reel speed AUTOMATIC setpoint percentage on display
        OnDemand_add_message( od_message_04 );
        if( _reel_speed_incr_debounced )
        {
            if( ++_timer01 > _AUTO_WAIT_INIT )                                //Watch for switch held
```

Fig. 23

```c
            _timer01 = 0;
            _reel_switch_state_b0_ui = _AUTOMATIC_INCR_02;
        )
        else
        (
            _timer01=0;
            _reel_switch_state_b0_ui = _TEST_REEL_MODE;
        )
        if( ee_reel_mode_nbl == _REEL_MODE_MANUAL )
        (
            _timer01 = 0;
            _reel_switch_state_b0_ui = _INIT;
        )
    break;

case _AUTOMATIC_INCR_02:
        _reel_dump_on;                                                              //Increment switch held, so auto-increment,
        if( _reel_speed_incr_debounced )                                            //Keep reel dump solenoid on
        (
            _timer01 = 0;                                                           //Slow down the auto inc/dec
            if( ( ++_timer01 == 50 )
                && ( ee_reel_automatic_set_pt_b0_uc < MAX_REEL_AUTO_SETPOINT ) )
            (
                _timer01 = 0;
                ee_reel_automatic_set_pt_b0_uc += 2;
                if( ee_reel_automatic_set_pt_b0_uc > MAX_REEL_AUTO_SETPOINT )
                    ee_reel_automatic_set_pt_b0_uc = MAX_REEL_AUTO_SETPOINT;
                // show reel speed AUTOMATIC setpoint percentage on display
                OnDemand_add_message( od_message_04 );
                _reel_switch_setpoint_b0_ui = ee_reel_automatic_set_pt_b0_uc;
            )
        )
        else
        (
            _reel_switch_state_b0_ui = _TEST_REEL_MODE;
            if( ee_reel_mode_nbl == _REEL_MODE_MANUAL )
                _reel_switch_state_b0_ui = _INIT;
        )
    break;

case _AUTOMATIC_DECR_01:
        _reel_switch_setpoint_b0_ui = ee_reel_automatic_set_pt_b0_uc;               //Decrement has been hit, increment one unit
        _reel_dump_on;                                                              // reel dump solenoid
        // show reel speed AUTOMATIC setpoint percentage on display
        OnDemand_add_message( od_message_04 );
        if( _reel_speed_decr_debounced )
        (
            if( ++_timer01 > _AUTO_WAIT_INIT )                                      //Watch for switch held
            (
                _timer01 = 0;
                _reel_switch_state_b0_ui = _AUTOMATIC_DECR_02;
            )
```

*Fig. 24*

```c
            }
            else
            {
                _timer01 = 0;
                _reel_switch_state_b0_ui = _TEST_REEL_MODE;
            }
            if( ee_reel_mode_nbl == _REEL_MODE_MANUAL )
            {
                _timer01 = 0;
                _reel_switch_state_b0_ui = _INIT;
            }
            break;

case _AUTOMATIC_DECR_02:
            _reel_dump_on;                                  //Decrement switch held, so auto-increment,
            if( _reel_speed_decr_debounced )                //Keep reel dump solenoid on
            {
                if( ( ++_timer01 == 50 )                    //Slow down the auto inc/dec
                    && ( ee_reel_automatic_set_pt_b0_uc > MIN_REEL_AUTO_SETPOINT )
                )
                {
                    _timer01 = 0;
                    ee_reel_automatic_set_pt_b0_uc -= 2;
                    if( ee_reel_automatic_set_pt_b0_uc < MIN_REEL_AUTO_SETPOINT )
                        ee_reel_automatic_set_pt_b0_uc = MIN_REEL_AUTO_SETPOINT;
                    // show reel speed AUTOMATIC setpoint percentage on display
                    OnDemand_add_message( od_message_04 );
                    _reel_switch_setpoint_b0_ui = ee_reel_automatic_set_pt_b0_uc;
                }
            }
            else
            {
                _reel_switch_state_b0_ui = _TEST_REEL_MODE;
            }
            if( ee_reel_mode_nbl == _REEL_MODE_MANUAL )
                _reel_switch_state_b0_ui = _INIT;
            break;

case _MANUAL:
            reel_cntrl_state_modified_to( REEL_CNTRL_STATE_MAN );
            _reel_switch_setpoint_b0_ui = ee_reel_manual_set_pt_b0_uc;
            _reel_dump_on;    // reel dump solenoid
            if( _reel_speed_incr_lh )
            {
                if( ee_reel_manual_set_pt_b0_uc < MAX_REEL_MANUAL_SETPOINT )  // test within limits
                    ee_reel_manual_set_pt_b0_uc += 1;
                _reel_switch_state_b0_ui = _MANUAL_INCR_01;
            }
            if( _reel_speed_decr_lh )
            {
                if( ee_reel_manual_set_pt_b0_uc > MIN_REEL_MANUAL_SETPOINT )  // test within limits
                    ee_reel_manual_set_pt_b0_uc -= 1;           // Field shows that 6% at 5.2 mph -1rpm chan
                _reel_switch_state_b0_ui = _MANUAL_DECR_01;
```

*Fig. 25*

```c
        }
        if( ee_reel_mode_nbl == _REEL_MODE_AUTOMATIC )
            _reel_switch_state_b0_ui = _INIT;
        break;

case _MANUAL_INCR_01:
        _reel_switch_setpoint_b0_ui = ee_reel_manual_set_pt_b0_uc;   //Increment has been hit, increment one unit
        _reel_dump_on;                                                // reel dump solenoid
        // show reel speed MANUAL setpoint rpm on display
        OnDemand_add_message( od_message_03 );
        if( _reel_speed_incr_debounced )                              //Watch for switch held
        {
            if( ++_timer01 > _AUTO_WAIT_INIT )
            {
                _timer01 = 0;
                _reel_switch_state_b0_ui = _MANUAL_INCR_02;
            }
        }
        else
        {
            _timer01 = 0;
            _reel_switch_state_b0_ui = _TEST_REEL_MODE;
        }
        if( ee_reel_mode_nbl == _REEL_MODE_AUTOMATIC )
        {
            _timer01 = 0;
            _reel_switch_state_b0_ui = _INIT;
        }
        break;

case _MANUAL_INCR_02:
        _reel_dump_on;                                                //Increment switch held, so auto-increment,
        if( _reel_speed_incr_debounced )                              //Keep reel dump solenoid on
        {
            if( ( ++_timer01 == 50 )                                  //Slow down the auto inc/dec
             && ( ee_reel_manual_set_pt_b0_uc < MAX_REEL_MANUAL_SETPOINT ) )
            {
                _timer01=0;
                ee_reel_manual_set_pt_b0_uc += 5;
                if( ee_reel_manual_set_pt_b0_uc > MAX_REEL_MANUAL_SETPOINT )
                    ee_reel_manual_set_pt_b0_uc = MAX_REEL_MANUAL_SETPOINT;
                // show reel speed MANUAL setpoint rpm on display
                OnDemand_add_message( od_message_03 );
                _reel_switch_setpoint_b0_ui = ee_reel_manual_set_pt_b0_uc;
            }
        }
        else
            _reel_switch_state_b0_ui = _TEST_REEL_MODE;
        if( ee_reel_mode_nbl == _REEL_MODE_AUTOMATIC )
            _reel_switch_state_b0_ui = _INIT;
```

Fig. 26

```
    break;

case _MANUAL_DECR_01:
    _reel_switch_setpoint_b0_ui = ee_reel_manual_set_pt_b0_uc;
    _reel_dump_on;                                                        //Decrement has been hit, increment one unit
    // show reel speed MANUAL setpoint rpm on display                     // reel dump solenoid
    OnDemand_add_message( od_message_03 );
    if( _reel_speed_decr_debounced )
    {
        if( ++_timer01 > _AUTO_WAIT_INIT )                                //Watch for switch held
        {
            _timer01 = 0;
            _reel_switch_state_b0_ui = _MANUAL_DECR_02;
        }
    }
    else
    {
        _timer01 = 0;
        _reel_switch_state_b0_ui = _TEST_REEL_MODE;
    }
    if( ee_reel_mode_nbl == _REEL_MODE_AUTOMATIC )
    {
        _timer01 = 0;
        _reel_switch_state_b0_ui = _INIT;
    }
    break;

case _MANUAL_DECR_02:
    _reel_dump_on;                                                        //Decrement switch held, so auto-increment,
    if( _reel_speed_decr_debounced )                                      //Keep reel dump solenoid on
    {
        if(   ( ++_timer01 == 50 )                                        //Slow down the auto inc/dec
           && ( ee_reel_manual_set_pt_b0_uc > MIN_REEL_MANUAL_SETPOINT ) )
        {
            _timer01=0;
            ee_reel_manual_set_pt_b0_uc -= 5;
            if( ee_reel_manual_set_pt_b0_uc < MIN_REEL_MANUAL_SETPOINT )
                ee_reel_manual_set_pt_b0_uc = MIN_REEL_MANUAL_SETPOINT;
            // show reel speed MANUAL setpoint rpm on display
            OnDemand_add_message( od_message_03 );
            _reel_switch_setpoint_b0_ui = ee_reel_manual_set_pt_b0_uc;
        }
    }
    else
        _reel_switch_state_b0_ui = _TEST_REEL_MODE;
    if( ee_reel_mode_nbl == _REEL_MODE_AUTOMATIC )
        _reel_switch_state_b0_ui = _INIT;
    break;

default:
```

*Fig. 27*

```c
        _reel_switch_state_b0_ui = _INIT;
        break;
    }
}

/*************************************************************/
unsigned int reel_switch_setpoint_status_b0_ui( void )
{
    return( _reel_switch_setpoint_b0_ui );
}

//************************************************************
void reel_input_wiggle( void )
{
    //check reel speed decrease switch
    if (
           iomap_digin_swstate_S20_reel_speed_decr.lh
        || iomap_digin_swstate_S20_reel_speed_decr.hl
       )
        wig_test_add_input( wig_test_s_20_decr_obj_idx );

//check reel speed increase switch
    if (
           iomap_digin_swstate_S20_reel_speed_incr.lh
        || iomap_digin_swstate_S20_reel_speed_incr.hl
       )
        wig_test_add_input( wig_test_s_20_incr_obj_idx );

//check automatic reel speed mode switch
    if (
           iomap_digin_swstate_S27_reel_spd_mode_auto.lh
        || iomap_digin_swstate_S27_reel_spd_mode_auto.hl
       )
        wig_test_add_input( wig_test_s_27_auto_obj_idx );

//check manual reel speed mode switch
    if (
           iomap_digin_swstate_S27_reel_spd_mode_man.lh
        || iomap_digin_swstate_S27_reel_spd_mode_man.hl
       )
        wig_test_add_input( wig_test_s_27_man_obj_idx );
}
```

Fig. 28

APPARATUS AND METHOD TO CALIBRATE THE REEL OF AN AGRICULTURAL WINDROWER

This application claims the benefit of U.S. Provisional Application Nos. 60/699,610, and 60/699,489, filed Jul. 15, 2005.

TECHNICAL FIELD

The present invention relates to agricultural windrowers and, more particularly, to apparatus and a method for calibrating a reel of an agricultural windrower.

BACKGROUND OF THE INVENTION

U.S. Pat. No. 6,901,729, is incorporated herein by reference in its entirety. This patent describes a header flotation system that is referred to as "non-independent". U.S. Provisional Application Nos. 60/699,610, and 60/699,489, filed Jul. 15, 2005, are also incorporated herein by reference in their entirety.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Briefly, the arms comprise elements of a lift and flotation mechanism or mechanisms operable for setting a height of the header above the ground or other surface over which the windrower moves, the flotation permitting the header to ride lightly up and over rises in the terrain during field operation.

Headers are typically available and a variety of configurations. Common elements of different headers include cutters operable for severing crops from the field. One typical cutting mechanism is a sickle cutter which includes a row of knives which extend across the width of the header and which are powered to move reciprocally sidewardly relative to a sidewardly extending array of fixed knives or bars, thereby effecting a cutting action. It is typically desirable for the cutters to operate at a constant speed, but, in operation, the cutting speed may vary as a result of changing conditions such as crop population, contact with the ground, or the like.

The sickle cutters may be accompanied by a reel disposed thereabove and rotatable for engaging the crop before cutting or other treatment, as is well-known in the art. It is of value to have a capability of varying the rotational speed of the reel versus ground speed to accommodate different crop conditions. In this regard, it is well-known to provide a capability for an operator to dial in a speed in revolutions per minute (rpm) using a speed selector dial, and for the reel to be rotated at the selected speed. A windrower may have the capability to be used with any of several headers, and the power required for driving the reel of a particular header at a selected speed may differ from that required for driving the reel of a different header.

A reel can be driven using a fluid drive, such as a fluid power takeoff (PTO), or a dedicated reel drive, of a windrower. A pump driven by the engine of the tractor provides pressurized fluid to the PTO system. The pump can be of a fixed displacement for fixed speed operation, or of variable displacement, in the latter instance, the pressurization and direction of fluid flow, and thus the speed and direction of operation of the reel, being controlled by a solenoid or solenoids. Varying electrical current signals would be utilized for operating the solenoids, for rotating the reel at the desired speed and in the desired direction, and the electrical current required for driving the reel at a selected speed would need to be known, such that the controller controlling the solenoids can apply the correct current responsive to an operator command for achieving a selected speed. Reel speed will typically fall within a range between about 100% of the ground speed of the windrower, and 130 to 140% thereof.

Therefore, it would be desirable to have an apparatus and method which enables calibrating solenoid current values with reel speed for a given header.

SUMMARY OF THE DISCLOSURE

What is disclosed is an apparatus and method which enables calibrating control signals for operating a reel of a header installed on a windrower, to facilitate precise control of the speed of the reel.

According to a preferred aspect of the invention the method and apparatus utilizes a fluid pump operable by a signal controlled device for controlling pressurized fluid flow to a reel for rotating the reel. A programmable control module in connection with the signal controlled device is operable for outputting control signals thereto having variable signal values, and the control module is programmed as part of a calibration routine for automatically outputting a predetermined first control signal having a first signal value to the signal controlled device to rotate the reel. Rotations of the reel are then counted for a predetermined time interval during the outputting of the first control signal to the signal controlled device, and information representative of a speed of rotation of the reel resulting from the first control signal, is determined. A second control signal having a second signal value different from the first signal value is then outputted to the signal controlled device to rotate the reel at a second speed, and rotations of the reel at the second speed for a predetermined time interval are counted, for determining information representative of the second speed resulting from the second control signal. Then, an algorithm or relationship of reel speed to control signal value is determined as a function of the information representative of the speeds of rotation of the reel resulting from the first and second control signals.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a written listing of steps of the preferred program of the invention;

FIG. 6 is a written listing of further steps of the preferred program of the invention;

FIG. 7 is a written listing of still further steps of the preferred program of the invention;

FIG. 8 is a written listing of still further steps of the preferred program of the invention; and FIG. 9 is a written listing of still further steps of the preferred program of the invention;

FIG. 10 is a written listing of still further steps of the preferred program of the invention;

FIG. 11 is a written listing of still further steps of the preferred program of the invention;

FIG. 12 is a written listing of still further steps of the preferred program of the invention;

FIG. 13 is a written listing of still further steps of the preferred program of the invention;

FIG. 14 is a written listing of still further steps of the preferred program of the invention;

FIG. 15 is a written listing of still further steps of the preferred program of the invention;

FIG. 16 is a written listing of still further steps of the preferred program of the invention;

FIG. 17 is a written listing of still further steps of the preferred program of the invention;

FIG. 18 is a written listing of still further steps of the preferred program of the invention;

FIG. 19 is a written listing of still further steps of the preferred program of the invention;

FIG. 20 is a written listing of still further steps of the preferred program of the invention;

FIG. 21 is a written listing of still further steps of the preferred program of the invention;

FIG. 22 is a written listing of still further steps of the preferred program of the invention;

FIG. 23 is a written listing of still further steps of the preferred program of the invention;

FIG. 24 is a written listing of still further steps of the preferred program of the invention;

FIG. 25 is a written listing of still further steps of the preferred program of the invention;

FIG. 26 is a written listing of still further steps of the preferred program of the invention;

FIG. 27 is a written listing of still further steps of the preferred program of the invention; and FIG. 28 is a written listing of still further steps of the preferred program of the invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
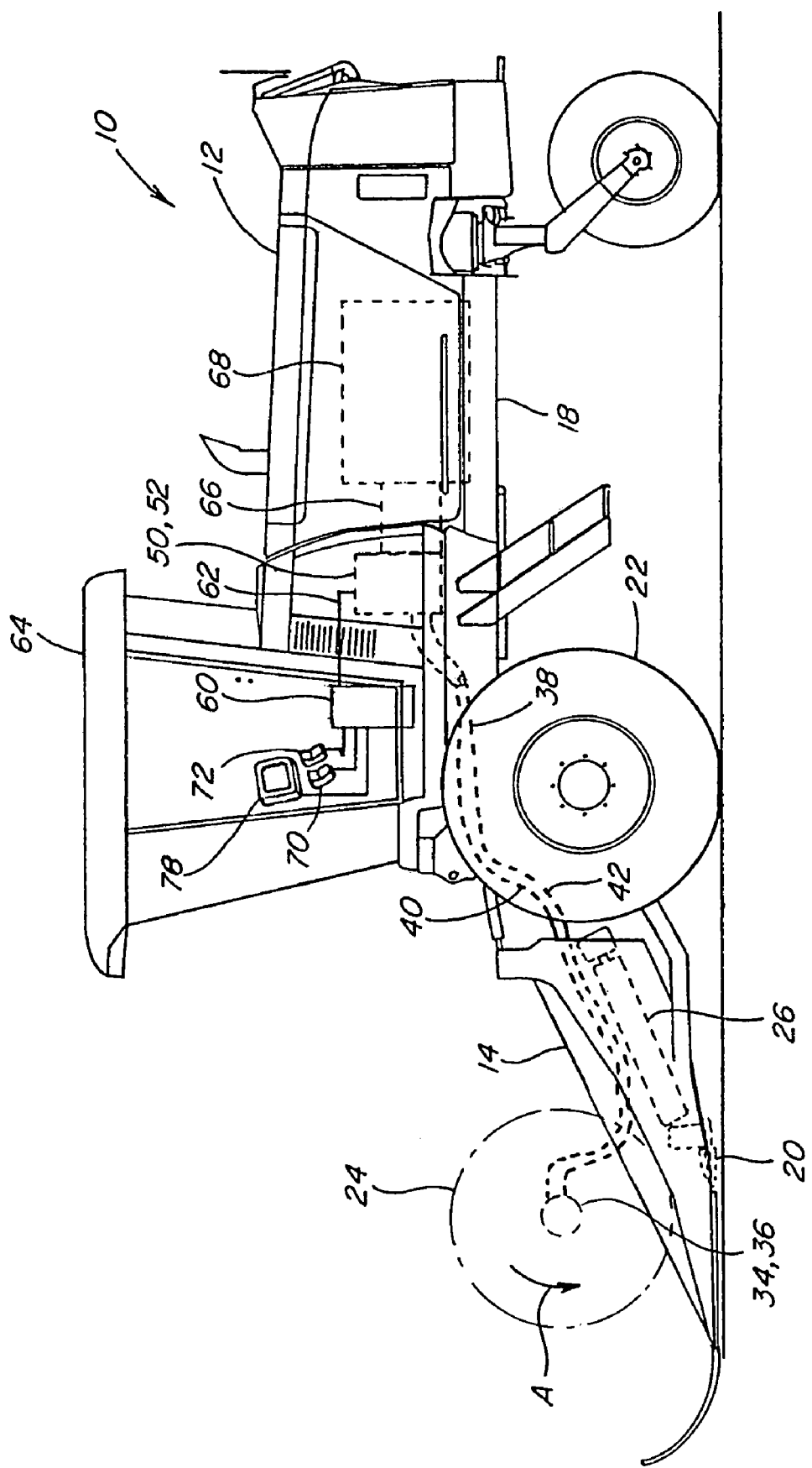
FIG. 1 is a side elevational view of a crop harvesting machine of the type with which the invention may be used, showing a header including a reel in connection with apparatus of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, header 14 being attached to the front end of a frame 18 or chassis of the tractor 12. The header may be of generally any suitable construction and design, and will include crop-harvesting mechanisms, such as a sickle cutter 20. Windrower 10 includes a propulsion driveline 22 controllably operable by an operator riding in an operator cab for propelling the windrower in a desired speed and direction. Header 14 additionally includes a reel 24 rotatable at a fixed or variable speed, as denoted by arrow A, for directing crops toward header 14 for harvesting by sickle cutter 20, as windrower 10 is moved over a field. A draper 26 comprising endless belts is disposed and operable for directing the harvested crop toward the center of header 14.

Reel 24 of header 14 is rotatably driven in direction A by a drive 34 which preferably includes a fluid motor 36. Fluid motor 36 is connected in fluid communication with a reel driveline 38 of tractor 12, by fluid lines 40 and 42, for receiving pressurized fluid therefrom. Sickle cutter 20 and draper 26 are separately driven utilizing any desired drive such as a fluid PTO drive, or the like.

Header 14 is removably mountable on a pair of lower arms 50 which extend forwardly from frame 18 of tractor 12, and which are movable upwardly and downwardly for positioning the header at a desired cutting height, or at an elevated transport position, using one or more lift cylinders (not shown), also in the well known manner. The upper end of the header is connected to frame 18 by an upper or center link connected to a mechanism operable for tilting the header to a desired orientation, again, in the well known manner.

Reel driveline 38 includes a fluid valve arrangement 52 controllably operable for directing pressurized fluid through fluid lines 40 and 42 as desired or required for powering reel 24. The flow of pressurized fluid to valve arrangement 52 is generated by a fixed displacement pump 66 driven by an engine 68 of windrower 10. Engine 68 also powers propulsion driveline 22 for propelling windrower 10.

Figure 2:
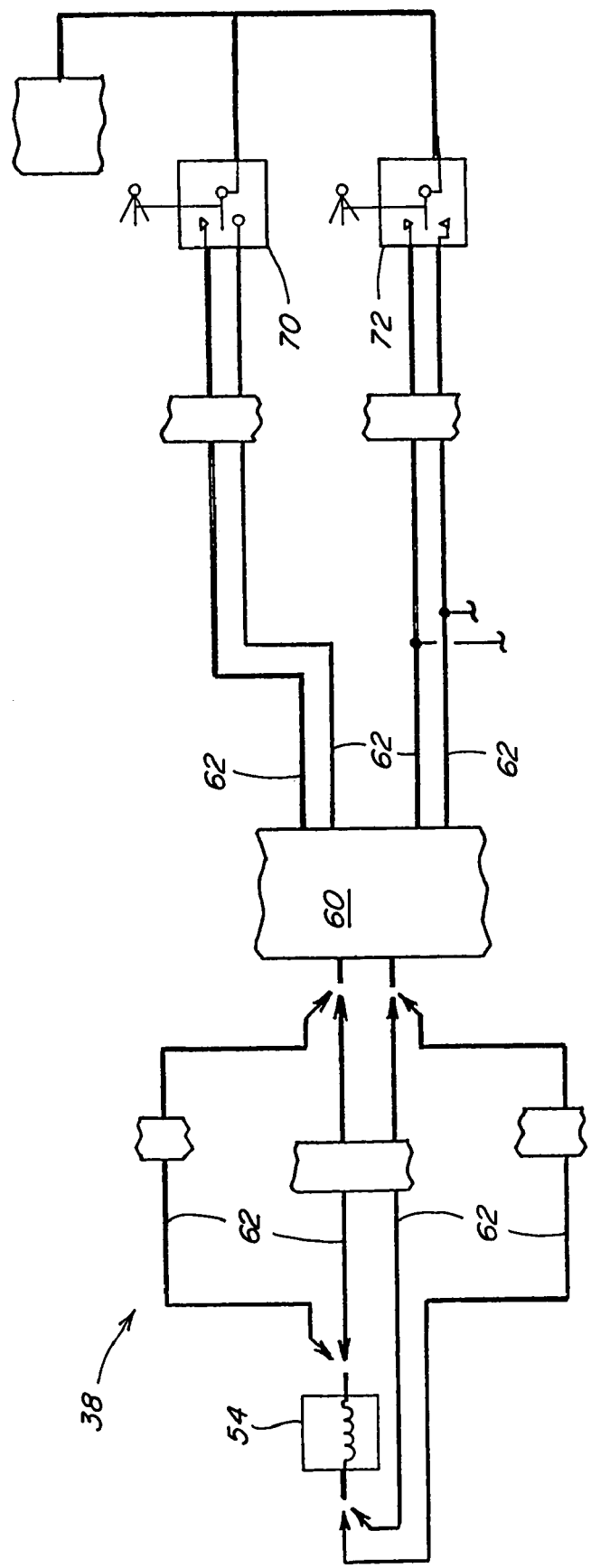
FIG. 2 is a schematic of a reel driveline of the machine of FIG. 1.

Referring also to FIG. 2, the displacement of pump 66 is a fixed, the flow being directed to speed proportional solenoid 54. Solenoid 54 is controlled by a control signal which is preferably an electrical signal, the electrical current value of which can be very precisely controllably varied through a range between zero and a greater amount. And, it is been found that reel driveline 38 can be configured such that the rotational speed of reel 24 will be linearly related to electrical current value. Reel driveline 38 includes a programmable control module 60 connected to solenoid 54 by suitable conductive paths 62, which can be, for instance, wires of a wiring harness. Control module 60 is preferably a conventionally constructed and operable microprocessor based tractor control module, or the like, suitably located on tractor 12, such as in an operator cab 64. A reel speed mode switch 70 and a reel speed switch 72, are additionally connected to control module 60 by conductive paths 62. Reel speed mode switch 70 is operable by an operator for inputting command signals to control module 60 for initiating and selecting an operating mode of reel 24. Reel speed switch 72 is operable by an operator for increasing or decreasing and operating speed of reel 24. Additionally, a display device 78 is operable for displaying information relating to the operation of reel 24, as well as other systems of windrower 10. Switches 70 and 72, and display device 78, are located within operator cab 64.

Reel 24 can be driven at any speed within a range of from zero to about 80 rpm, and will typically be driven a speed between about 20 and 78 rpm. In this regard, if reel 24 is driven at a rotational speed wherein a lower radial outer periphery of the rotating reel is moving at a speed relative to the ground and crops to be harvested which is slower than the travel speed of header 14, the reel may have a tendency to engage and push the crops in the forward direction, away from sickle cutter 20, which is typically not desired. Instead, it is desired to direct the crop toward sickle cutter 20. As a result, in most instances, it will be desired to rotate reel 24 at a speed which propels the lower outer periphery of the reel at a speed in relation to the ground at least equal to the ground speed of header 14, which will also be the ground speed of windrower 10.

Propulsion driveline 22 includes a pair of drive wheels, the rotational speed of which is monitored to generate information representative of a ground speed of windrower 10. Therefore, the ground speed of windrower 10, at any time, can be known. Reel speed switch 72 can be utilized for inputting speed commands to control module 60, which, in turn, will output control signals to reel speed proportional solenoid 54 for controlling the output flow of pump 66, for delivering pressurized fluid to fluid motor 36 of drive 34. Given a known diameter of reel 24, the speed of the lower periphery of reel 24 can be determined from a rotational speed of the reel. If the speed of the lower periphery of the reel is determined, and the ground speed of the windrower is known, then the speed of the lower periphery relative to the ground can be determined. What is needed then, is a capability to determine a range of values for the control signal, that is, electrical current values, which will drive fluid motor 36 within a known range of speeds corresponding to a predicted range of ground speeds of windrower 10. This capability is provided by the instant invention.

Figure 3:
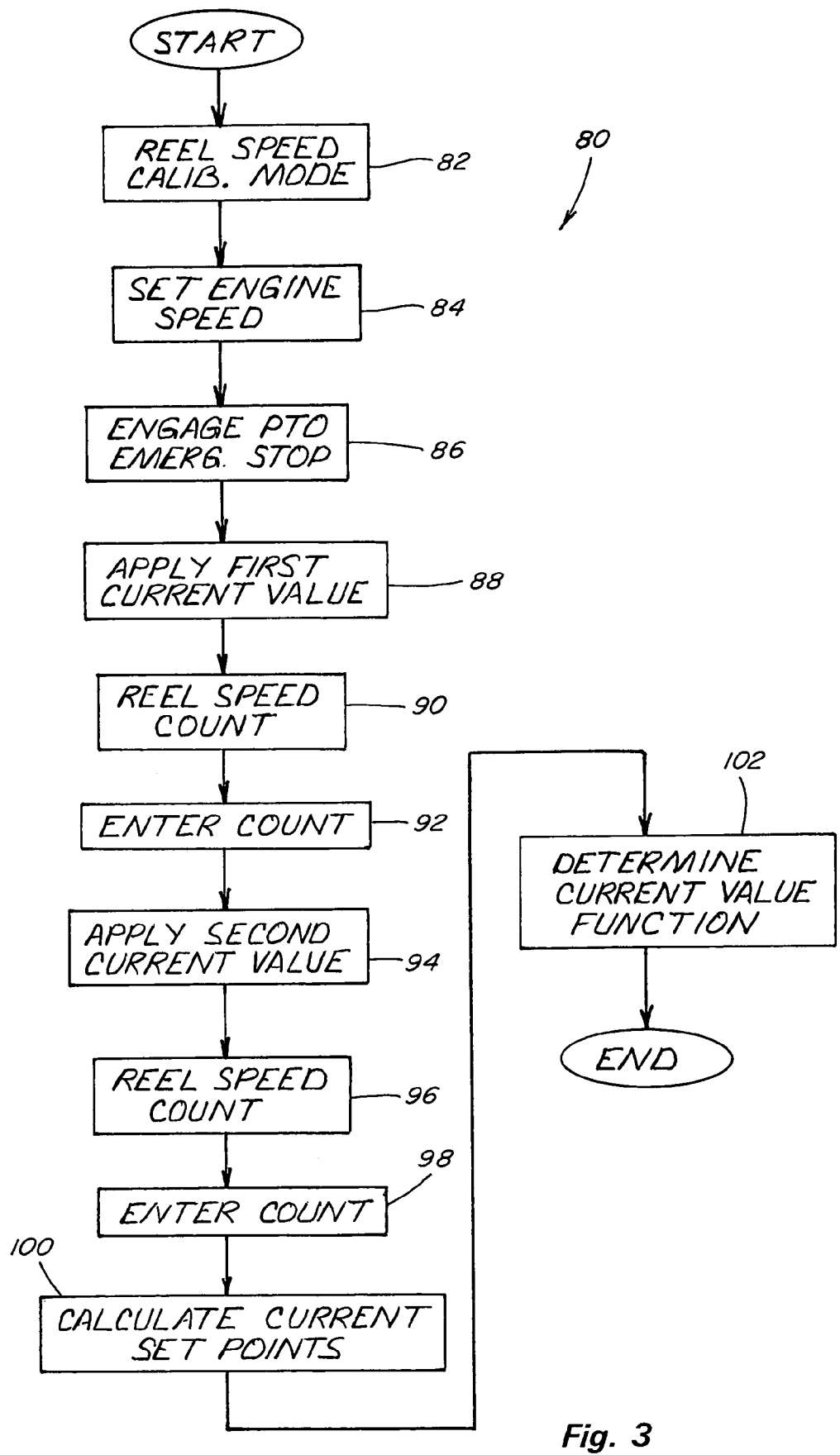
FIG. 3 is a high level flow diagram of steps of a preferred embodiment of a computer program of the invention.

Referring also to FIG. 3, a flow diagram 80 including steps of the invention for calibrating reel speed with control signal value, is illustrated. At block 82, operation of control module 60 in a reel speed calibration mode is initiated. The speed of engine 68 is set and held, as denoted at block 84. The engine speed is predetermined and will be sufficient for operating pump 66 at the system pressure for reel driveline 38. An emergency stop for preventing operation of PTO for driving sickle cutter 20 will be engaged, as denoted at block 86. Then, an electrical control signal having a known first current value, will automatically be applied to solenoid 54 by control module 60, as denoted at block 88. The first current value will preferably be sufficient for rotating reel 24 at a relatively slow speed. The number of rotations of reel 24 for a predetermined time interval, as driven by the first current value, will then be counted, as denoted at block 90. This can be done by an operator observing and counting the rotations, or by a suitable speed sensor configured for determining the rotational speed of reel 24, if present. The count will then be entered into a register of control module 60, as denoted at block 92. This can be done in a suitable manner, such as using a touchscreen feature of display device 78, if present, or utilizing one of the other switches, such as by jogging speed switch 72 to select a value.

When the count has been successfully entered, control module 60 will automatically apply a control signal to solenoid 54 having a predetermined second current value, which will preferably effect rotation of reel 24 at a faster speed than the first current value, as denoted at block 94. The number of rotations of reel 24 for a predetermined time interval, as driven by the second current value, will then be counted, as denoted at block 96. Again, this can be done by an operator observing and counting the rotations, or by a suitable speed sensor configured for determining the rotational speed of reel 24, if present. The count will then be entered into a register of control module 60, as denoted at block 98.

Figure 4:
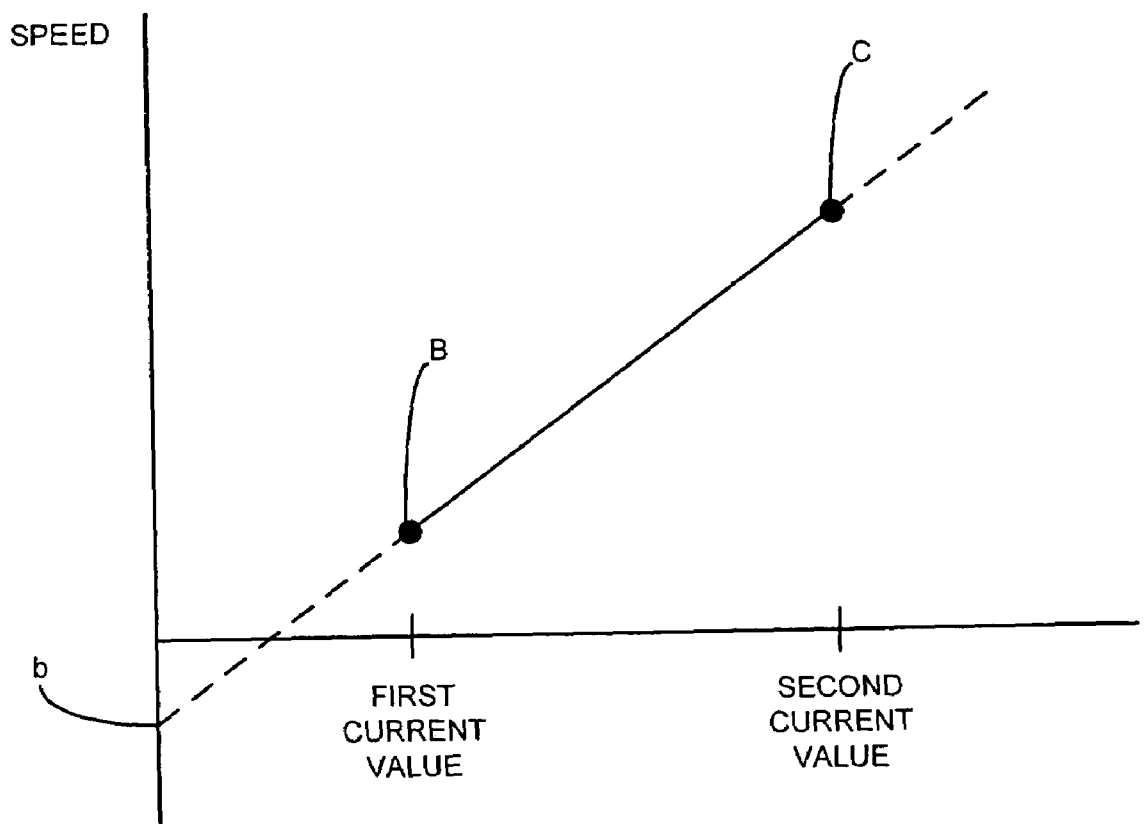
FIG. 4 is graphical illustration of a representative relationship between reel speed and control signal value determined according to a method of the invention.

Next, current set points will be determined, as denoted at block 100. This will comprise the speeds of rotation of reel 24 for each of the first and second current values. This is illustrated by set points B and C in FIG. 4. Because the relationship of reel speed to current value can be configured to be substantially linear, a linear function for relationship defining the rotational speed of reel 24 as a function of electrical current value, can be determined, as denoted at block 102, using a linear equation or curve fitting technique:

$$\text{Speed} = (\text{slope}) * (\text{current value}) + b$$

Where b is an intercept speed value for a current value of zero. As a result, a rotational speed of reel 24 for a current value between set points B and C can be determined, as can rotational speeds beyond those set points, within a reasonable range. Again, if the rotational speed for a given current value is known, then the resulting speed of the periphery of reel 24 will be known.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method of calibrating a reel of an agricultural windrower, comprising steps of:
    providing a windrower including a fluid pump operable by a signal controlled device for controlling pressurized fluid flow to a reel of a header of the windrower for rotating the reel;
    providing a programmable control module in connection with the signal controlled device and operable for outputting control signals thereto having variable signal values; and
    wherein the control module is programmed as part of a calibration routine for automatically:
    outputting a predetermined first control signal having a first signal value to the signal controlled device to rotate the reel;
    counting rotations of the reel for a predetermined time interval during the outputting of the first control signal to the signal controlled device;
    determining information representative of a speed of rotation of the reel resulting from the first control signal;
    outputting a predetermined second control signal having a second signal value different from the first signal value to the signal controlled device to rotate the reel;
    counting rotations of the reel for a predetermined time interval during the outputting of the second control signal;
    determining information representative of a speed of rotation of the reel resulting from the second control signal; and
    determining an algorithm predictive of speeds of rotation of the reel for a range of control signal values as a function of the information representative of the speeds of rotation of the reel resulting from the first and second control signals.

2. The method of claim 1, wherein the signal values comprise electrical currents.

3. The method of claim 1, wherein an engine of the windrower is operated at a constant speed during the calibration.

4. The method of claim 1, where in the algorithm the speeds of rotation of the reel will be at least generally linearly related to values of the outputted control signals.

5. The method of claim 1, wherein the rotations of the reel are counted by an operator and inputted to the control module.

6. The method of claim 1, wherein the rotations of the wheel are sensed by a sensor and inputted to the control module.

7. Apparatus for calibrating a reel of an agricultural windrower, comprising:
- a fluid pump operable by a signal controlled device for controlling pressurized fluid flow to a reel for rotating the reel; and
- a programmable control module in connection with the signal controlled device and operable for outputting control signals thereto having variable signal values, wherein the control module is programmed as part of a reel calibration routine for automatically outputting a predetermined first control signal having a first signal value to the signal controlled device to rotate the reel, determining information representative of a first speed of rotation of the reel resulting from the first signal value, and outputting a predetermined second control signal having a second signal value different from the first signal value to the signal controlled device to rotate the reel, determining information representative of a second speed of rotation of the reel resulting from the second signal value, and determining a relationship between the speed of rotation of the reel and values of the control signals as a function of the information representative of the speeds of rotation of the reel resulting from the first and second control signals.

8. Apparatus of claim 7, wherein the signal values comprise electrical currents.

9. Apparatus of claim 7, wherein the control module programmed for automatically controllably operating an engine of the windrower at a constant speed during the calibration routine.

* * * * *